United States Patent
Link et al.

(10) Patent No.: US 10,412,092 B2
(45) Date of Patent: Sep. 10, 2019

(54) METHOD, APPARATUS, AND SYSTEM FOR RESTRICTING ACCESS

(71) Applicant: NINTENDO CO., LTD., Kyoto (JP)

(72) Inventors: Patrick J. Link, Kyoto (JP); Ben Van Ong, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/583,024

(22) Filed: Dec. 24, 2014

(65) Prior Publication Data

US 2016/0191533 A1    Jun. 30, 2016

(51) Int. Cl.
*H04L 29/06* (2006.01)
*H04W 12/08* (2009.01)
*H04W 12/02* (2009.01)

(52) U.S. Cl.
CPC .......... *H04L 63/102* (2013.01); *H04L 63/123* (2013.01); *H04W 12/08* (2013.01); *H04W 12/02* (2013.01)

(58) Field of Classification Search
CPC ....... H04L 63/10; H04L 63/123; H04W 4/008
See application file for complete search history.

(56) References Cited

U.S. PATENT DOCUMENTS

| | | | | |
|---|---|---|---|---|
| 6,724,813 B1* | 4/2004 | Jamal | ................... | H04W 72/02 375/219 |
| 6,889,212 B1* | 5/2005 | Wang | ................... | G06Q 30/06 370/259 |
| 9,053,513 B2* | 6/2015 | Meredith | ............... | G06Q 20/00 |
| 9,444,533 B1* | 9/2016 | Naim | ................... | H04W 64/006 |
| 2005/0177612 A1* | 8/2005 | Duong | .................... | G06F 9/485 709/200 |
| 2008/0076392 A1* | 3/2008 | Khetawat | ............. | H04L 63/123 455/411 |
| 2013/0269029 A1* | 10/2013 | Nakawatase | ............ | H04L 63/16 726/22 |
| 2013/0326614 A1* | 12/2013 | Truskovsky | ............ | G06F 21/44 726/19 |
| 2014/0146742 A1* | 5/2014 | Khandekar | .......... | H04B 1/7073 370/328 |
| 2014/0331272 A1* | 11/2014 | Gupta | .................... | H04L 63/20 726/1 |
| 2016/0080279 A1* | 3/2016 | Tan | ....................... | H04W 40/38 370/328 |
| 2016/0080943 A1* | 3/2016 | Ives-Halperin | ........ | G06Q 10/02 713/168 |
| 2016/0142389 A1* | 5/2016 | Denker | ................... | H04L 63/08 726/4 |

* cited by examiner

*Primary Examiner* — Simon P Kanaan
(74) *Attorney, Agent, or Firm* — Nixon & Vanderhye P.C.

(57) ABSTRACT

Techniques for restricting access to sensitive application(s) or data to a limited physical area are disclosed. Various embodiments are described in which a tethering station and a wireless storage controller communicate with each other over a radio link. The tethering station can be secured such that the tethering station's location restricts the range within which the wireless storage controller is allowed to enable access to a mobile storage controlled by the wireless storage controller. This restricts access to the application and/or the application stored in the mobile storage to a limited area through radio tethering.

32 Claims, 12 Drawing Sheets

US 10,412,092 B2

METHOD, APPARATUS, AND SYSTEM FOR RESTRICTING ACCESS

BACKGROUND

Before a software application, such as a game for a game system, is released for general consumption, the application undergoes an extensive evaluation process. One very important concern is to maintain security of the application, e.g., to ensure that the application is not distributed to unauthorized persons. This is especially true prior to a general release.

The evaluation process can involve using evaluators to test and evaluate the application. There can be many evaluators who are geographically remote from the where the application is being developed. This can pose challenges when the application is distributed to these external evaluators.

Due to the security concerns, one traditional way to distribute an unreleased application is to store/record the application on a storage device, such as on a cartridge, and physically hand-carry the storage device to the destination. This is repeated for each destination, i.e., for each external evaluator. Further, whenever the application is modified or updated, the laborious process to physically distribute the updated version is repeated again for each destination. At the destination, a computing system (e.g., a game system) that executes the application is physically secured. For example, the computing system can be secured to a desk, which in turn is secured to the floor. Such a traditional way to distribute applications is slow, cumbersome, and expensive.

DETAILED DESCRIPTION OF EXAMPLE NON-LIMITING EMBODIMENTS OF THE TECHNOLOGY

Figure 1A:
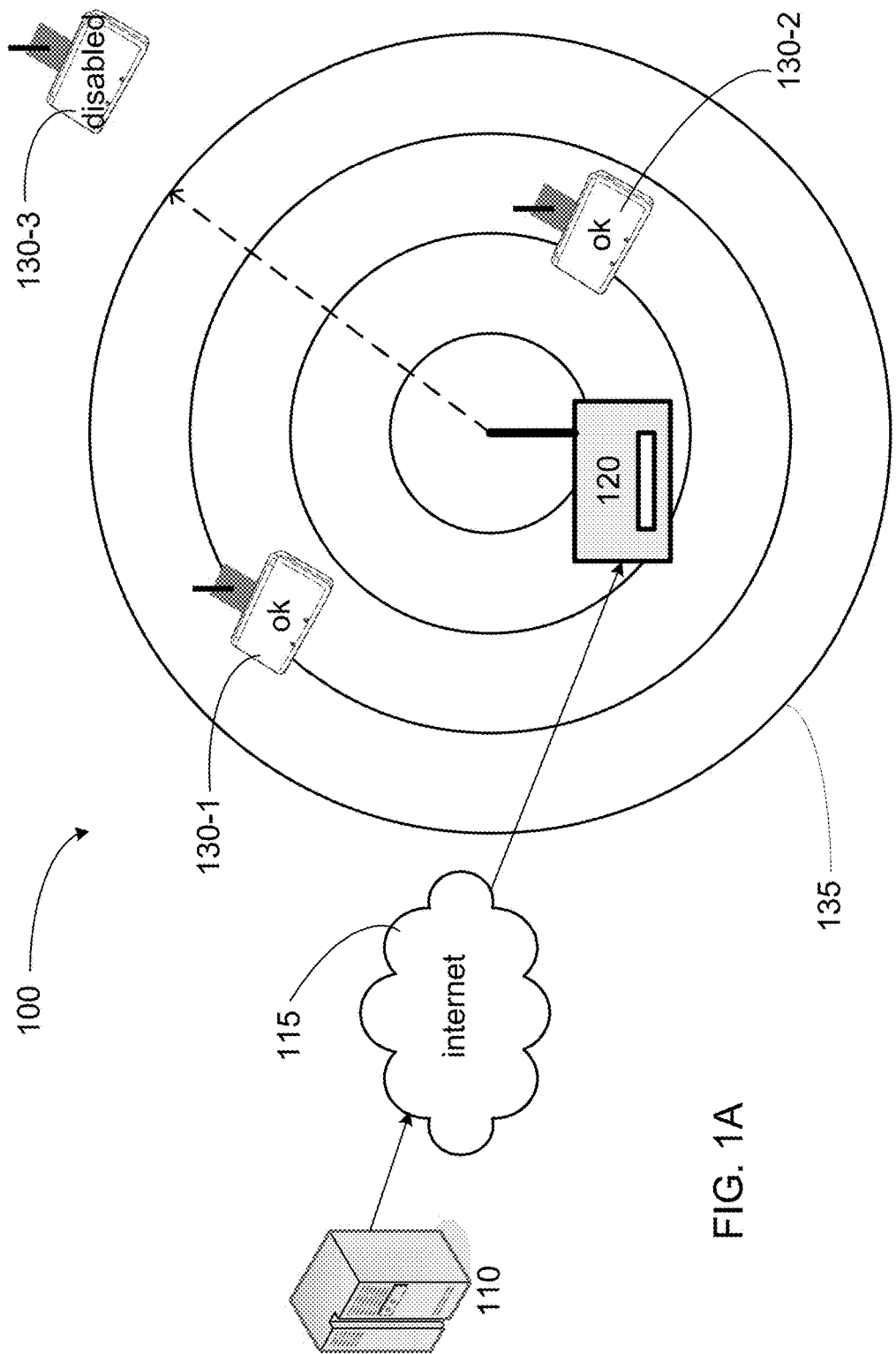
FIGS. 1A and 1B illustrate non-limiting example implementations of radio tethering.

For purposes of explanation and not limitation, specific details are set forth such as particular architectures, interfaces, techniques, and so on. However, it will be apparent that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown. The computer readable medium may be transitory or non-transitory.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

It is mentioned above that the traditional way of distributing an unreleased application—physically hand-carrying the application to each destination—can be slow, cumbersome, and expensive. Note that the traditional distribution method can also slow down the update process since the distributions of updates are physically hand-carried as well.

Also, at the destination, physically securing the computing system may inhibit or lessen the evaluation process. For example, a game may be designed such that the game experience is enhanced if some amount of freedom of movement of the game system is allowed. But securing the game system to a fixed location may restrict the freedom of movement. It would thus be helpful deliver the application and updates quickly to the destination and allow the evaluation experience to be maximized, while maintaining security at the same time.

Below, distribution of an application, e.g., a game, in accordance with one or more non-limiting aspects will be described. It should be noted that some or all of the described aspects will be applicable to the distribution of information in general, not just to software applications. For example, it may be desirable to securely distribute a file containing data that is viewable only at a limited number of physical destinations.

FIG. 1A illustrates a non-limiting example implementation of radio tethering that alleviates some or all problems associated with the traditional way of secure distribution and evaluation of an application. As seen, the implementation 100 may include a tethering station 120 and one or more wireless storage devices 130. Each wireless storage device 130 can be in communication with the tethering station 120 over a radio link.

Each wireless storage device 130, which is a memory device, can have any number of applications stored therein. In the figure, three wireless storage devices 130-1, 130-2 and 130-3 are shown, but there can be any number of wireless storage devices 130. The wireless storage devices 130-1 and 130-2 are physically within a communication range 135 of the tethering station 120. Each wireless storage device 130 within the communication range 135 may operate to enable or disable access to the applications stored in a mobile storage 230 (see FIG. 2) associated with that wireless storage device 130 depending on the communication between the tethering station 120 and that wireless storage device 130. The wireless storage device 130-3, which is outside of the range 135, operates so as to disable access to the associated mobile storage 230. Thus, it is seen that from at least one perspective, each wireless storage device 130 is "tethered" to the tethering station 120.

It may be assumed that a computing system (e.g., a game system) accesses the wireless storage device 130 to run the application(s) stored in the associated mobile storage 230. Each wireless storage device 130 can be connected to the corresponding computing system. But to maintain simplicity of illustration, the corresponding computing systems are not illustrated in FIG. 1A.

Also while not explicitly shown, it may be assumed that the tethering station 120 is secured. For example, it may be physically secured. Physical security does not necessarily require the tethering station 120 to be immovably fixed (such as being bolted to the floor) although that is one way to achieve security. But it does mean that preferably, the physical movement of the tethering station 120 should be highly restricted. This is because from at least one perspective, the tethering station 120 serves as an anchoring point such that the location of the tethering station 120 can be used to define an area of the communication range 135 for the radio tethering. Security may be provided in other ways including virtual security. For example, it may be that the tethering station 120 is a part of a particular network and/or may occupy one of particular range of IP addresses. Presumably, the network and the parts there of are secured.

The tethering station 120 may also participate in securely distributing the application(s). As seen in FIG. 1A, the implementation 100 may include a server 110 that communicates securely (e.g., via encryption) with the tethering station 120 over a private or public network 115 (e.g., internet). The tethering station 120 can download the application(s) from the server 110 over the network 115, and program the wireless storage devices 130 with the downloaded application(s).

Figure 1B:
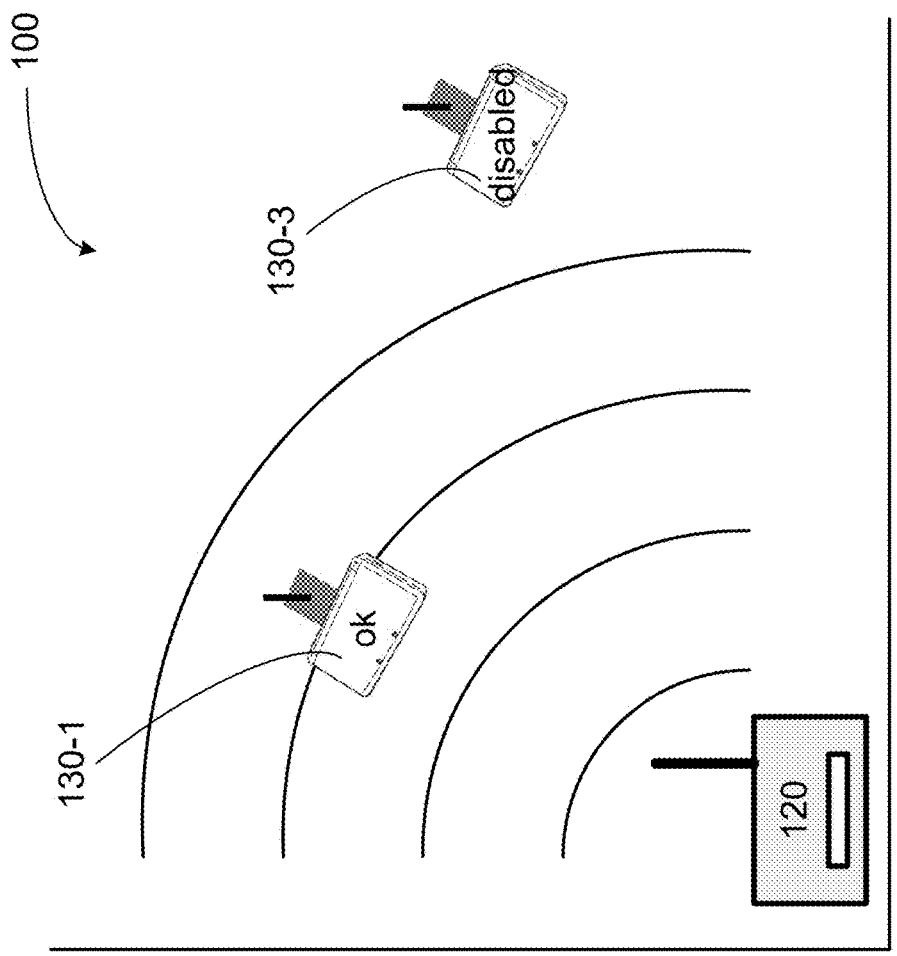

Note that the physical location of the tethering station 120 is not limited. FIG. 1B illustrates another non-limiting example implementation of the radio tethering. For sake of simplicity, the server 110 is not illustrated in FIG. 1B. In this implementation 100, the tethering station 120 is shown to be physically located in a corner of a room. This allows a significant level of flexibility in locating the wireless storage devices 130, which means flexibility in locating the corresponding computing systems.

In FIG. 1A, the radio signals emanating from the tethering station 120 is illustrated to be omni-directional. But as seen in FIG. 1B, the radio signals can be directional, i.e., limited to a certain arc. This can be used to enhance security in case eavesdropping mechanisms are placed just outside the walls near the corner where the tethering station 120 is located.

Figure 2:
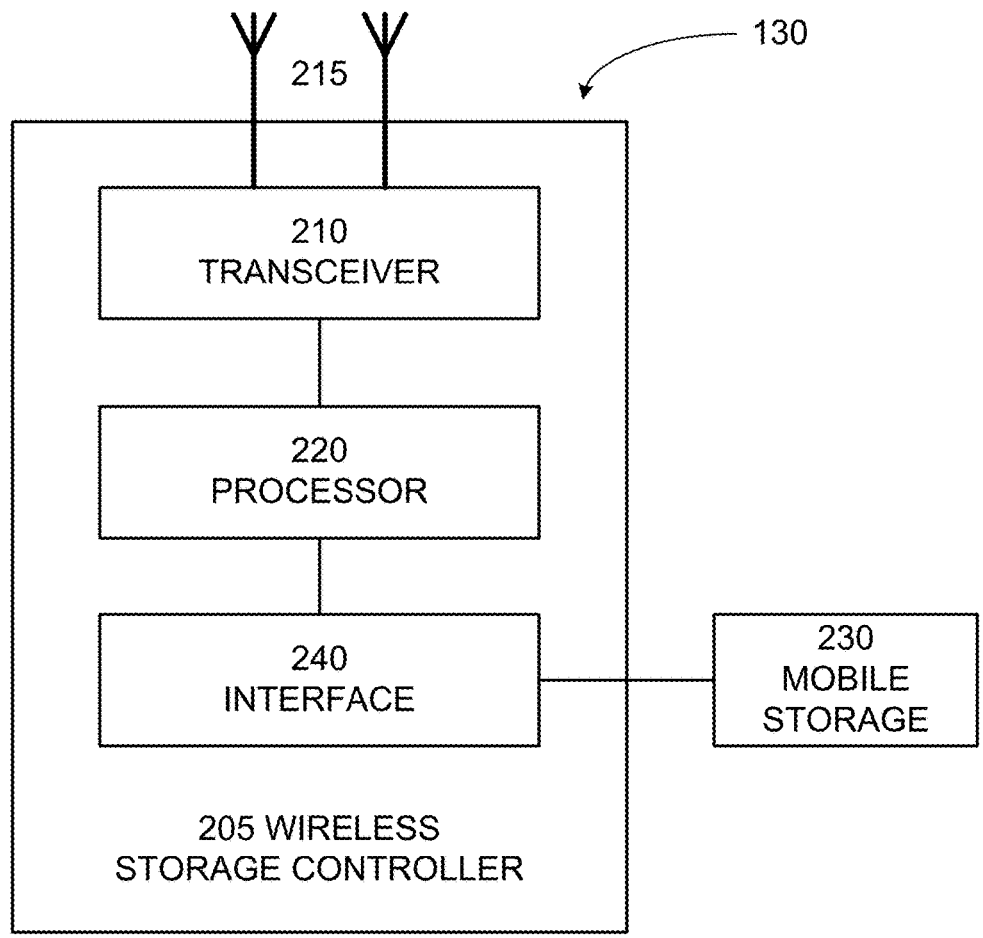
FIG. 2 is a block diagram of a non-limiting example of a wireless storage device including a wireless storage controller configured to implement radio tethering.

FIG. 2 is a block diagram of a non-limiting example of a wireless storage device 130. As seen, the wireless storage device 130 may include a wireless storage controller 205 configured to control access to a mobile storage 230. The wireless storage controller 205 may include a transceiver 210, a processor 220, and an interface 240. It is envisioned that each of the elements 210, 220 and 240 maybe implemented in hardware, software, or a combination thereof such that the wireless storage controller 205 as a whole is implemented in hardware or as a combination of hardware and software.

The transceiver 210 may be configured to communicate over the radio link with the tethering station 120 via one or more antennas 215. Note that the antennas 215 may be internal or external. The interface 240 may read from and write to the storage 230. When the wireless storage device 130 is in a programming mode, e.g., by being physically connected to the tethering station 120, the tethering station 120 may program the mobile storage 230 with the application(s) through the interface 240. When the wireless storage device 130 is in an access mode, e.g., by being physically connected to the corresponding computing system, the computing system may access the application(s) stored in the mobile storage 230 through the interface 240. The processor 220 may control the overall operations of the wireless storage device 130 including individually controlling any one or more of the transceiver 210, the mobile storage 230, and the interface 240. In particular, the processor 220 may enable/disable access to the mobile storage 230 depending on the circumstances.

In one embodiment, the mobile storage 230 may be integrated with the wireless storage controller 205 such that the wireless storage device 130 is a single integrated device. In another embodiment, the mobile storage 230 may be separate and configured to be detachably attached to the wireless storage controller 205. The mobile storage 230 may include one or more non-transitory storage medium and/or firmware (e.g., ROM, RAM, Flash) and may be configured to store therein data including one or more applications. The mobile storage 230 may be volatile, non-volatile, or include a combination of volatile and non-volatile memory devices.

Figure 3A:
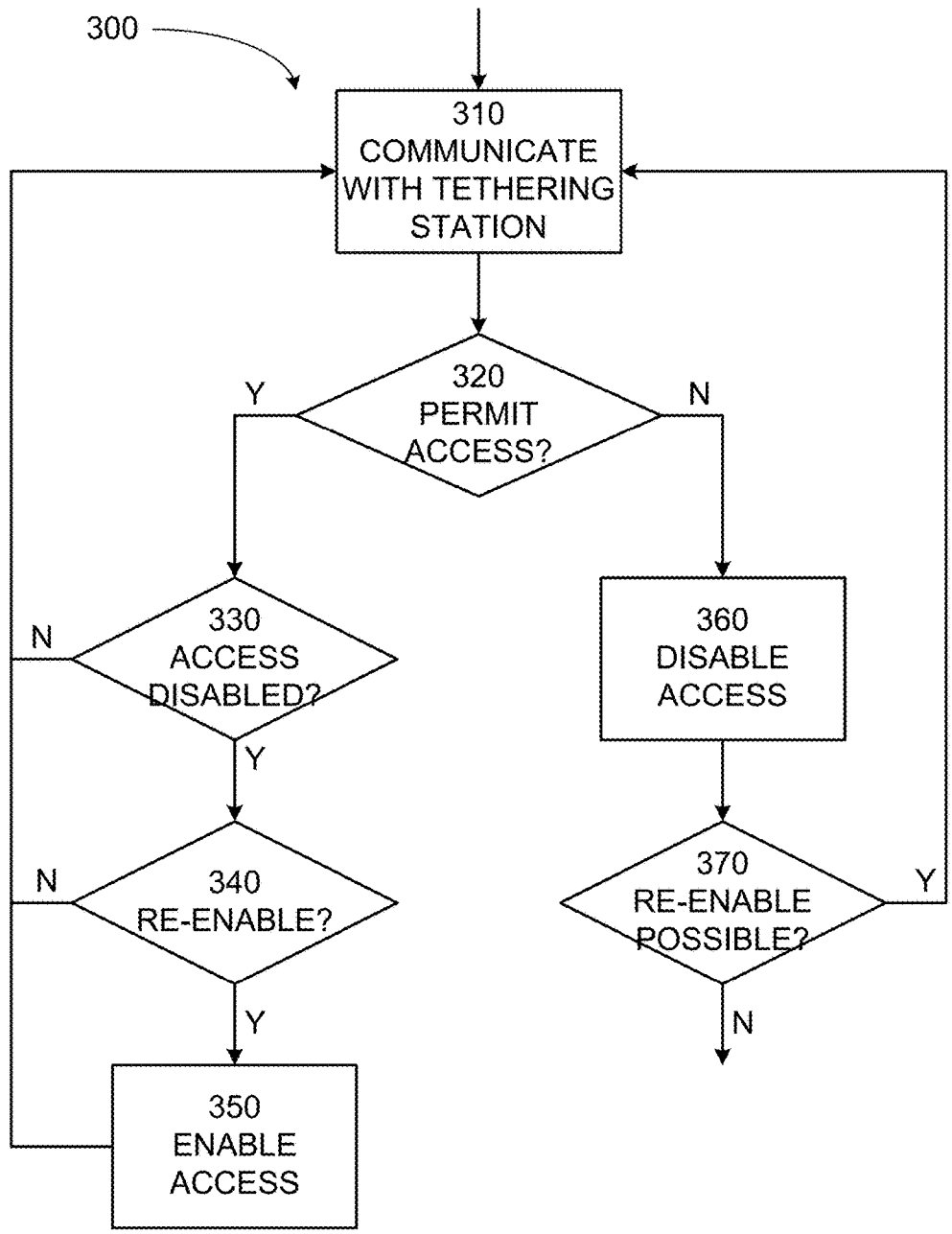
FIGS. 3A and 3B illustrate flow charts of non-limiting methods performed by a wireless storage controller to implement radio tethering.

FIG. 3A illustrates a non-limiting flow chart of a method 300 performed by the wireless storage device 130, and in particular the wireless storage controller 205, to implement the radio tethering. In the method 300, it can be assumed that one or more applications are programmed into the mobile storage 230 of the wireless storage device 130, and that the wireless storage device 130 is connected to the computing system such that the wireless storage controller 205 can permit access to at least one application to the computing system. It can also be assumed that the tethering station 120 and the wireless storage controller 205 are communicating with each other over a radio link. Preferably, the communication between the tethering station 120 and the wireless storage controller 205 occurs regularly (e.g., every second, two seconds, etc.). Each may initiate the communication to which the other may be required to respond within a limited amount of time.

In step 310, during one of these communications, the transceiver 210 can receive a message from the tethering station 120 over the radio link. For sake of clarity, "downlink message" will be used to refer to a message in the direction from the tethering station 120 to the wireless storage controller 205. Conversely, "uplink message" will be used to refer to a message in the opposite direction—from the wireless storage controller 205 to the tethering station 120. Thus, the transceiver 210 may receive the downlink message in step 310.

Figure 4A:
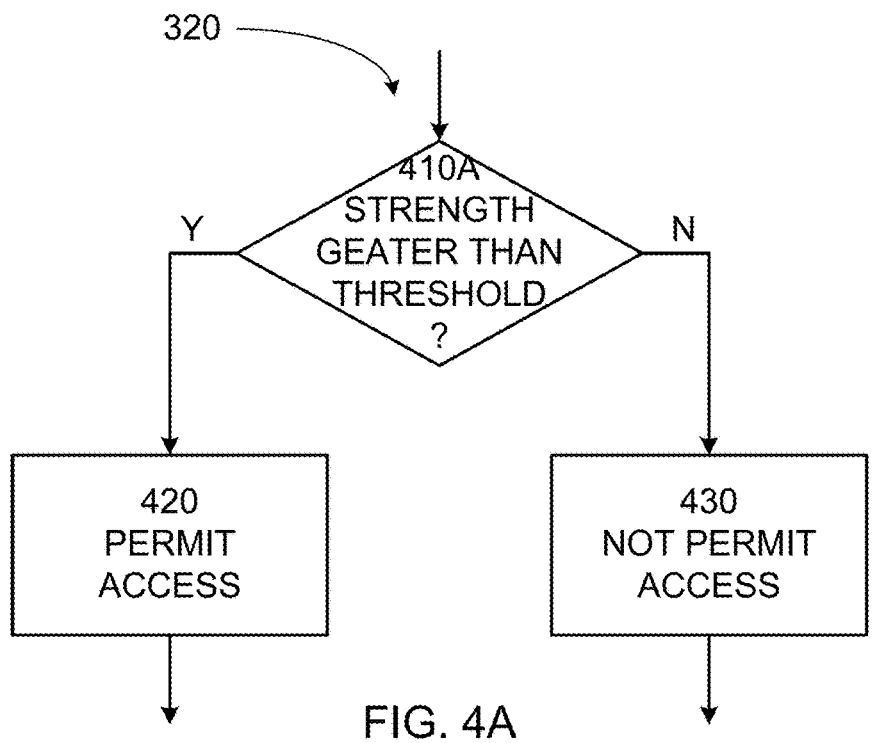
FIGS. 4A-4G illustrate flow charts of non-limiting processes performed by a wireless storage controller to determine whether or not access to a mobile storage is permitted.

In step 320, the processor 220 may determine whether the computing system can be permitted to access the mobile storage 230 based on the downlink message. The processor 220 may perform step 320 in plural ways. Recall that the wireless storage controller 205 communicates with the tethering station 120 over the radio link. Thus, one simple way is to make the determination based on the radio signal strength as illustrated in FIG. 4A. For example, the processor 220 may determine in step 410A whether the strength of the radio signal used to carry the downlink message is above a threshold strength. If so (YES in step 410A), the processor 220 may determine that the computing system can be permitted access in step 420. If not (NO in step 410A), the processor 220 may determine otherwise in step 430.

Figure 4B:
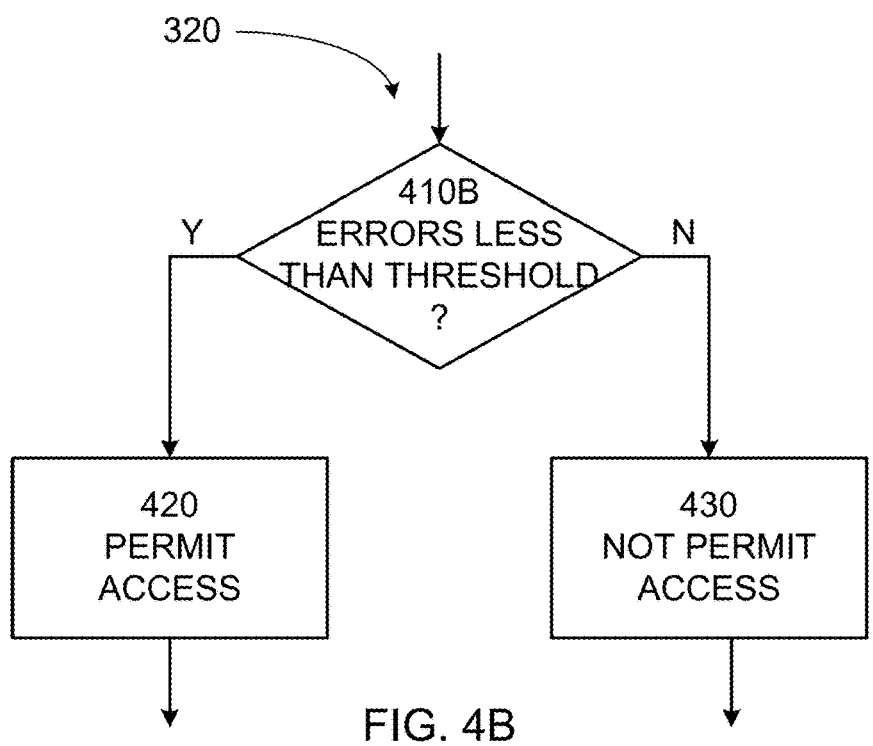

While the radio signal strength can be used, it may not very reliable since it is relatively easy to boost the transmission power at the tethering station 120. Thus, in one or more non-limiting embodiments, the processor 220 may use downlink message to perform step 320. FIGS. 4B-4F illustrate just some of the non-limiting ways. As illustrated in FIG. 4B, the processor 220 may determine whether there are less than a threshold number of errors in the downlink message. If so (YES in step 410B), the processor 220 may determine that the computing system can be permitted access in step 420. If not (NO in step 410B), the processor 220 may determine otherwise in step 430.

Figure 4C:
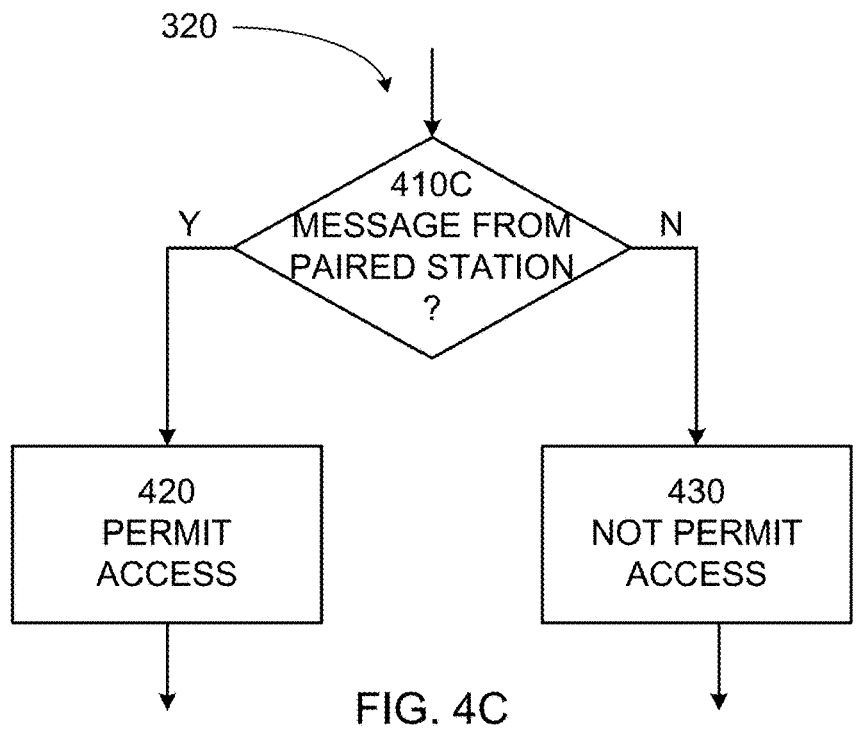

In FIG. 4C, it can be assumed that the tethering station 120 and the wireless storage device 130 are paired with each other. Note that the pairing can be between the tethering station 120 and the wireless storage controller 205, between the tethering station 120 and the mobile storage 230, or between the tethering station 120 and the combination of the wireless storage controller 205 and the mobile storage 230. It is mentioned above that the tethering station 120 can program the mobile storage 230 with an application or applications through the interface 240. In a non-limiting embodiment, the tethering station 120 can program the wireless storage controller 205 and/or the mobile storage 230 with the pairing information as well. As illustrated in FIG. 4C, the processor 220 may determine whether or not the downlink message is a message from a tethering station 120 that is paired with the wireless storage device 130 in step 410C. For example, the downlink message may include information that can be used to identify the source of the downlink message. If so (YES in step 410C), the processor 220 may determine that the wireless storage device 130 is within the allowable range 135 in step 420. If not (NO in step 410C), the processor 220 may determine otherwise in step 430. In one embodiment, pairing may be viewed as the wireless storage controller 205 learning of the radio address of the tethering station 120 and/or vice versa. In another embodiment, pairing may be accomplished through key or keys as described further below.

It is possible to pair a wireless storage device 130 with multiple tethering stations 120. However, it may be preferred that a wireless storage device 130 be paired with one tethering station 120, i.e., the tethering station 120 that programmed the wireless storage device 130. On the other hand, it may be preferred to allow a single tethering station 120 to be paired with multiple wireless storage devices 130.

The pairing can be at the application level. That is, the application stored in the mobile storage 230 may be paired with the tethering station 120. For example, the mobile storage 230 may have sufficient space to store more than one application (more generically, store more than one file). In this instance, each application may be paired to the programming tethering station 120. Of course, the storage level and application level pairings can be combined.

Figure 4D:
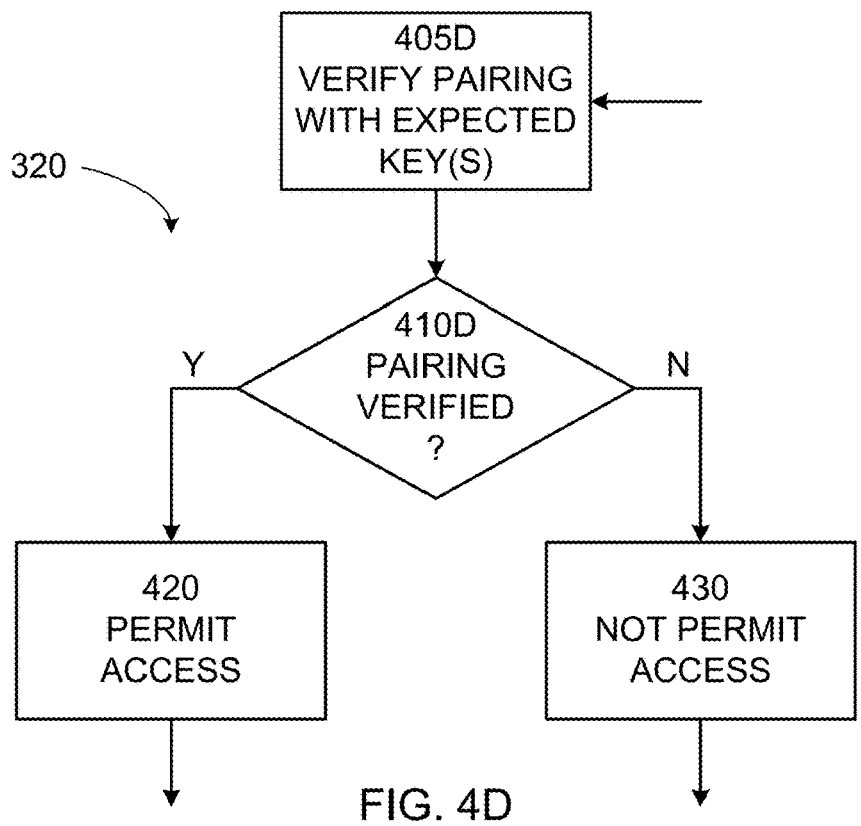

The pairing described above can be viewed as an example of authenticating the source of the downlink message using the identity of the tethering station 120 as a key. It is also possible to use other keys or even plural keys to pair the tethering station 120 and the wireless storage device 130. In FIG. 4D, it can be assumed that the processor 220 uses one or more keys for pairing verification purposes, i.e., verify that the source of the downlink message is the tethering station 120. Again, the tethering station 120 may program the key or keys to the wireless storage controller 205 along with the application(s) in the mobile storage 230 such that the processor 220 can verify the pairing. In another embodiment, the wireless storage controller 205 may itself include one or more keys. In this instance, the tethering station 120 and the wireless storage controller 205 may exchange keys at the time the application(s) are programmed.

As illustrated in FIG. 4D, the processor 220 may verify the pairing, i.e., verify the downlink message as being from the tethering station 120, using one or more expected keys in step 405D. The term "expected keys" may be explained as follows. When the key(s) used is(are) static, i.e., do not change from one message to the next, the static key(s) is(are) expected by definition. But in a non-limiting embodiment, there may be plural number of keys, and different key(s) may be used in different communications between the tethering station 120 and the wireless storage device 130. Also, an order of the key(s) used may be known to both the tethering station 120 and the wireless storage device 130. For example, the sequence or a sequencing algorithm may be programmed into the wireless storage controller 205 and/or the mobile storage 230. In one downlink message, one key or set of keys may be expected, and in another downlink message, a different key or set of keys may be expected.

In step 410D, the processor 220 may determine whether the pairing verification using the expected key(s) is successful or not. If so (YES in step 410D), the processor 220 may determine that the computing system can be permitted access in step 420. If not (NO in step 410D), the processor 220 may determine otherwise in step 430.

Figure 4E:
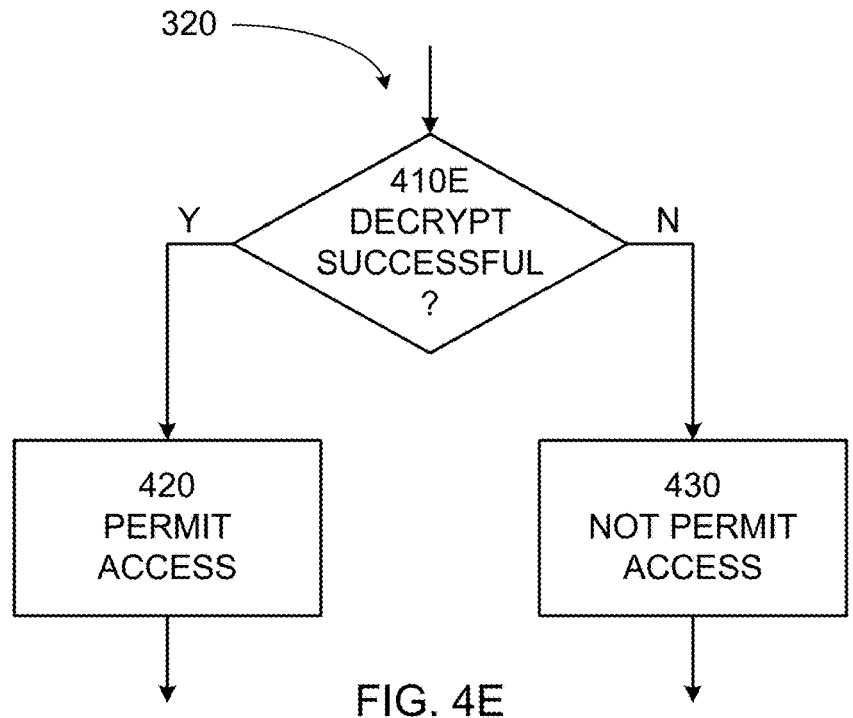

In FIG. 4E, it can be assumed that the communication between the tethering station 120 and the wireless storage controller 205 are encrypted using one or more keys. Note that the encryption can be viewed as a form of authentication as well. The encryption can be symmetric (encryption and decryption key(s) being the same) or asymmetric (encryption and decryption key(s) being different). The processor 220 may use one or more keys for encryption and/or decryption purposes. Again, the tethering station 120 may program the key or keys to the wireless storage device 130 along with the application(s), or the keys may be exchanged. In a relatively simple embodiment, the tethering station 120 and the wireless storage device 130 may share same key or keys. Also, all of the uplink and downlink messages may be encrypted. In step 410E, the processor 220 may determine whether the decryption of the downlink message is successful or not. If so (YES in step 410E), the processor 220 may determine that the computing system can be permitted access in step 420. If not (NO in step 410E), the processor 220 may determine otherwise in step 430.

Any one or more processes illustrated in FIGS. 4A-4E may be combined. For example, FIGS. 4B and 4C may be combined disjunctively. That is, the processor 220 may determine that the wireless storage device 130 is within the allowable range 135 when the downlink message includes less than the threshold number of errors or when the downlink message is verified to be from the paired tethering station 120 (YES in step 410B or in step 410C). If a stricter requirement is desired, then FIGS. 4B and 4C may be combined conjunctively (YES in step 410B and in step 410C).

Figure 4G:
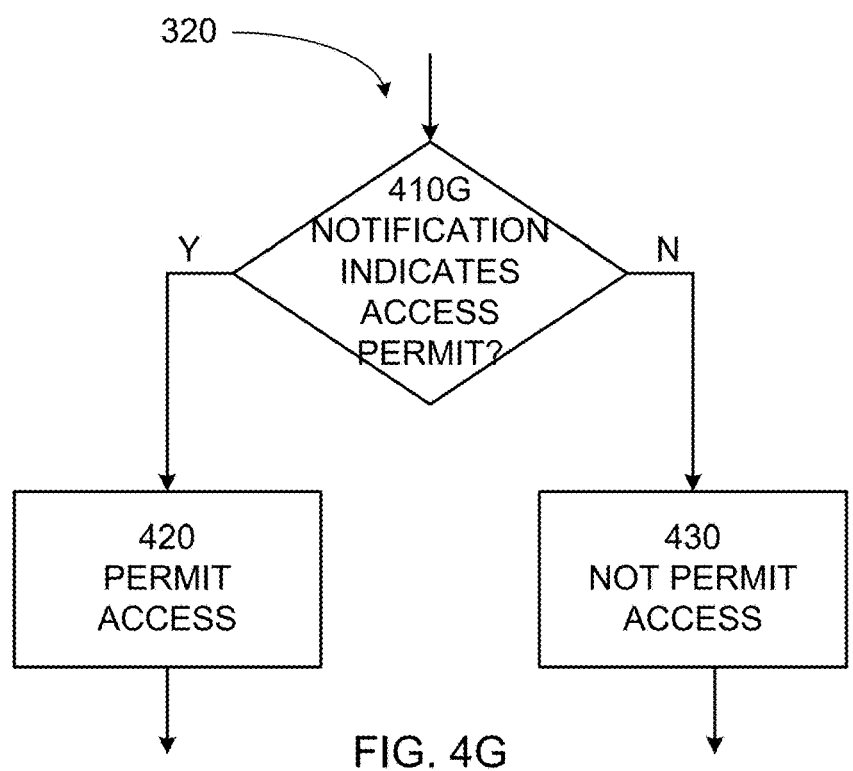
Figure 4F:
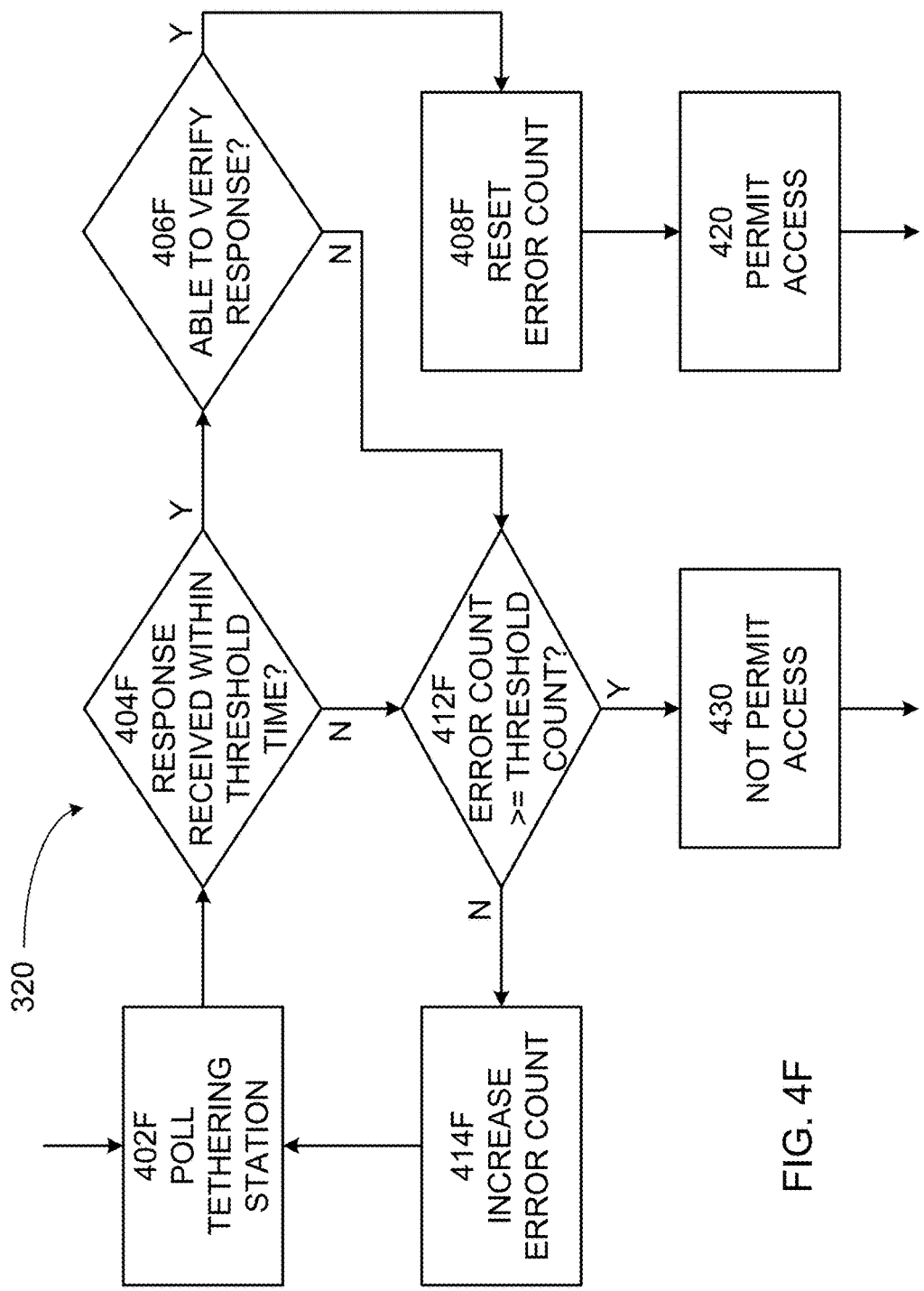

FIG. 4F illustrates an example in which FIGS. 4B and 4E are combined. In step 402F, the processor 220 may poll, via the transceiver 210, the tethering station 120 by sending a polling message. The polling message may be encrypted or keyed with appropriate pairing key or keys. In step 404F, the processor 220 may determine whether or not the transceiver 210 received a response from the tethering station 120 within a threshold time. If so (YES in step 404F), the processor 220 may proceed step 406F to determine whether or not the response can be verified. For example, if the response was keyed, then the processor 220 may determined whether the expected key or keys were received. As another example, if the response is encrypted, the processor 220 may determine whether the decryption is successful. If so (YES in step 406F), the processor 220 may reset an error count in step 408F and determine that the computing system can be permitted access in step 420.

However, if the processor 220 is unable to verify the response (NO in step 406F), the processor 220 may determine whether or not the error count is at or above a threshold count in step 412F. If so (YES in step 412F), the processor 220 may determine that the computing system cannot be permitted access in step 430. If not (NO in step 412F), the processor 220 may proceed step 414F to increase the error count and to poll the tethering station in step 402F. Note that the processor 220 may proceed to step 412F when the response from the tethering station 120 is not received within the threshold time (NO in step 404F).

As another example, FIG. 4A may be combined conjunctively with any of the FIGS. 4B-4F. That is, the processor 220 determined that the computing system can be permitted access when the downlink radio is above the threshold strength and at least one of the other conditions of FIGS. 4B-4F is satisfied.

In the description above with regard to FIGS. 4A-4F, it is seen that the wireless storage controller 205 can actively determine whether the computing system can or cannot be permitted access. But in other non-limiting embodiments, the tethering station 120 can make the determination and notify the wireless storage controller 205. This is illustrated in FIG. 4G in which it can be assumed that the downlink message includes a notification that indicates whether or not the computing system can be permitted access. In step 410G, the processor 220 can determine whether or not the computing system can or cannot be permitted access based simply on the notification. If the notification so indicates (YES in step 410G), the processor 220 may determine that the wireless storage device 130 is within the allowable range 135 in step 420. If not (NO in step 410G), the processor 220 may determine otherwise in step 430.

One advantage (of which there can be several) of the tethering station 120 making the actual determination is that the wireless storage device 130 as a whole, and the processor 220 in particular, can be simplified. Presumably, the processing capabilities of the tethering station 120 will be much greater than that of the wireless storage device 130. Thus, it is likely that there will be very little (if any) negative impact to the tethering station 120. At the same time, there may be significant positive impact to the wireless storage device 130.

The processes performed by the tethering station 120 to determine whether the computing system can be permitted access can be similar to the processes illustrated in FIGS. 4A-4F, except that the tethering station 120 would make the determinations based on the uplink messages from the wireless storage controller 205. If a precise determination is desirable, by combining the processes illustrated in FIGS. 4A-4G may be more easily realized in the tethering station 120.

Figure 5:
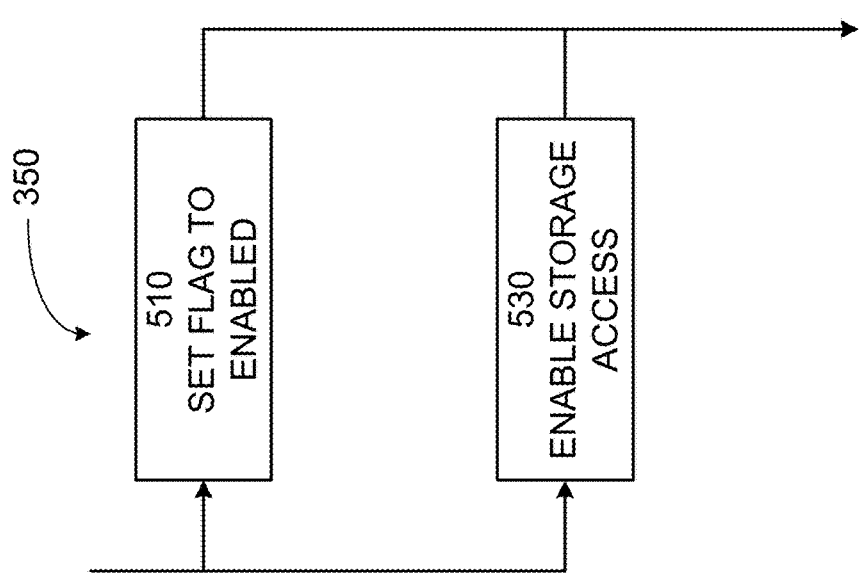
FIG. 5 illustrates a flow chart of a non-limiting process performed by a wireless storage controller to enable access to a mobile storage.

Referring back to FIG. 3A, when it is determined in step 320 that the computing system can be permitted access (YES in step 320), the processor 220 in step 350 may enable the application access to the computing system. More generally, a file access may be enabled in step 350. FIG. 5 illustrates a flow chart of a non-limiting process performed by the processor 220 to implement step 350. The access may be set at the application level, i.e., access to each application may be enabled or disabled individually. If there are multiple applications in the mobile storage 230, the wireless storage controller 205 may enable access for one application and simultaneously disable access for another application. In an embodiment, an application flag (more generally a file flag) may be associated with each application. To enable access to that application, the processor 220 may set the associated flag value to ENABLED in step 510.

The access may also be set at the storage level. That is, the processor 220 may enable the access to the mobile storage 230 in step 530. In FIG. 2, it is seen that the interface 240 is connected to the mobile storage 230 (when integrated) or is connectable to the mobile storage 230 (when not integrated). To allow access to the mobile storage 230, operations of both the mobile storage 230 and the interface 240 should be enabled. Of course, the application and storage level access may be utilized in a combination.

Referring back to FIG. 3A, step 350 may always be performed whenever it is determined that the computing system can be permitted access in step 320. But in another embodiment, step 350 is not automatically performed. In this embodiment, when it is determined that the computing system can be permitted access (YES in step 320), the processor 220 in step 330 may determine whether the access to the application is currently disabled—either at the application or at the storage level.

If the access is currently enabled (NO in step 330), no change is required. But if the access is currently disabled (YES in step 330), then the processor 220 may determine in step 340 whether it is authorized for re-enabling of the application access. In one embodiment, the tethering station 120 can authorize the re-enabling. If it is determined that the re-enabling is authorized (YES in step 340), then the processor 220 may perform step 350 to enable the application access.

When it is determined that the computing system cannot be permitted access (NO in step 320), the processor 220 in step 360 may disable the application access. More generally, a file access may be disabled in step 360. When the application access is disabled, the disablement may be recoverable or unrecoverable. A recoverable disablement indicates that the processor 220 can perform step 350 to re-enable access to that application. Conversely, an unrecoverable disablement indicates that the processor 220 cannot or will not perform step 350. An application that is unrecoverably disabled may be enabled through actions performed external to the wireless storage device 130. For example, the tethering station 120 may perform the re-enabling process.

Figure 6:
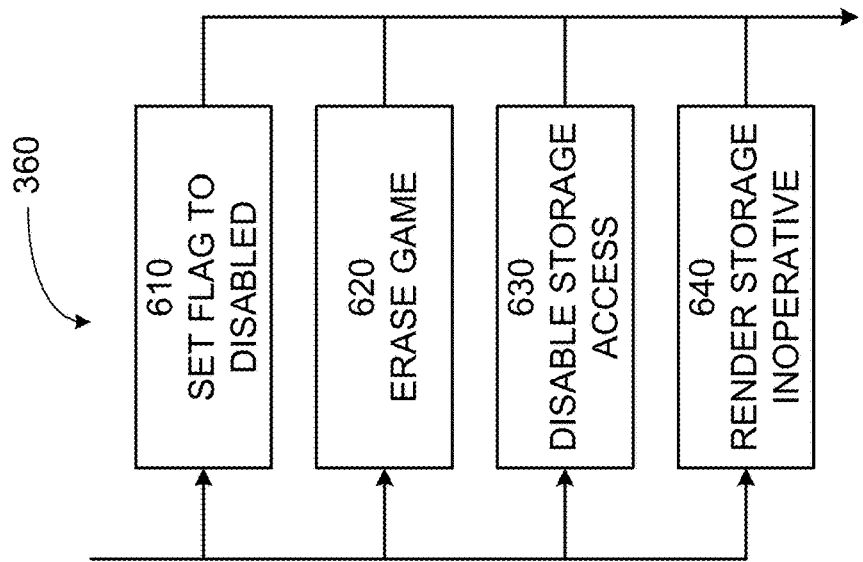
FIG. 6 illustrates a flow chart of a non-limiting process performed by a wireless storage controller to disable access to a storage a mobile storage.

FIG. 6 illustrates a flow chart of a non-limiting process performed by the processor 220 to implement step 360. Recall from above that access may be enabled at the application level. Likewise, the access may be disabled at the application level. In step 610, the processor may set the flag associated with the application to DISABLED. This is a form of a recoverable disablement at the application level since the application itself is left intact. But in step 620, the processor 220 may erase the application from the mobile storage 230. This is a form of an unrecoverable disablement at the application level.

At the storage level, the processor 220 may simply disable access to the mobile storage 230 in step 630. For example, the processor 220 may disable the mobile storage 230 from responding to requests from the interface 240. Alternatively (or in addition thereto), the processor 220 may disable the interface 240 from responding to requests from the computing system in step 630. This is recoverable since the access to the mobile storage 230 (and the interface 240 if necessary) may be re-enabled in step 530.

However, processor 220 may disable the mobile storage 230 unrecoverably in step 640. For example, there may be a storage switch and/or an interface switch that when set allows the mobile storage 230 to be accessed. The processor 220 may be capable of unsetting one or both of the switches, but incapable of resetting either of the switches. As another example, the contents of the storage 230 may be erased.

Referring back to FIG. 3A, after the application access is disabled, the processor 220 may determine whether re-enabling is possible in step 370. For example, a recoverable disablement may have been performed in step 360. If so (YES in step 370), then the processor 220 may proceed back to step 310. But if an unrecoverable disablement has been performed in step 360, the wireless storage controller 205 will not be able to re-enable access to the application. But even if the application itself is left intact, it may be that the processor 220 does not re-enable the application once the access is disabled for security or other reasons.

Figure 3B:
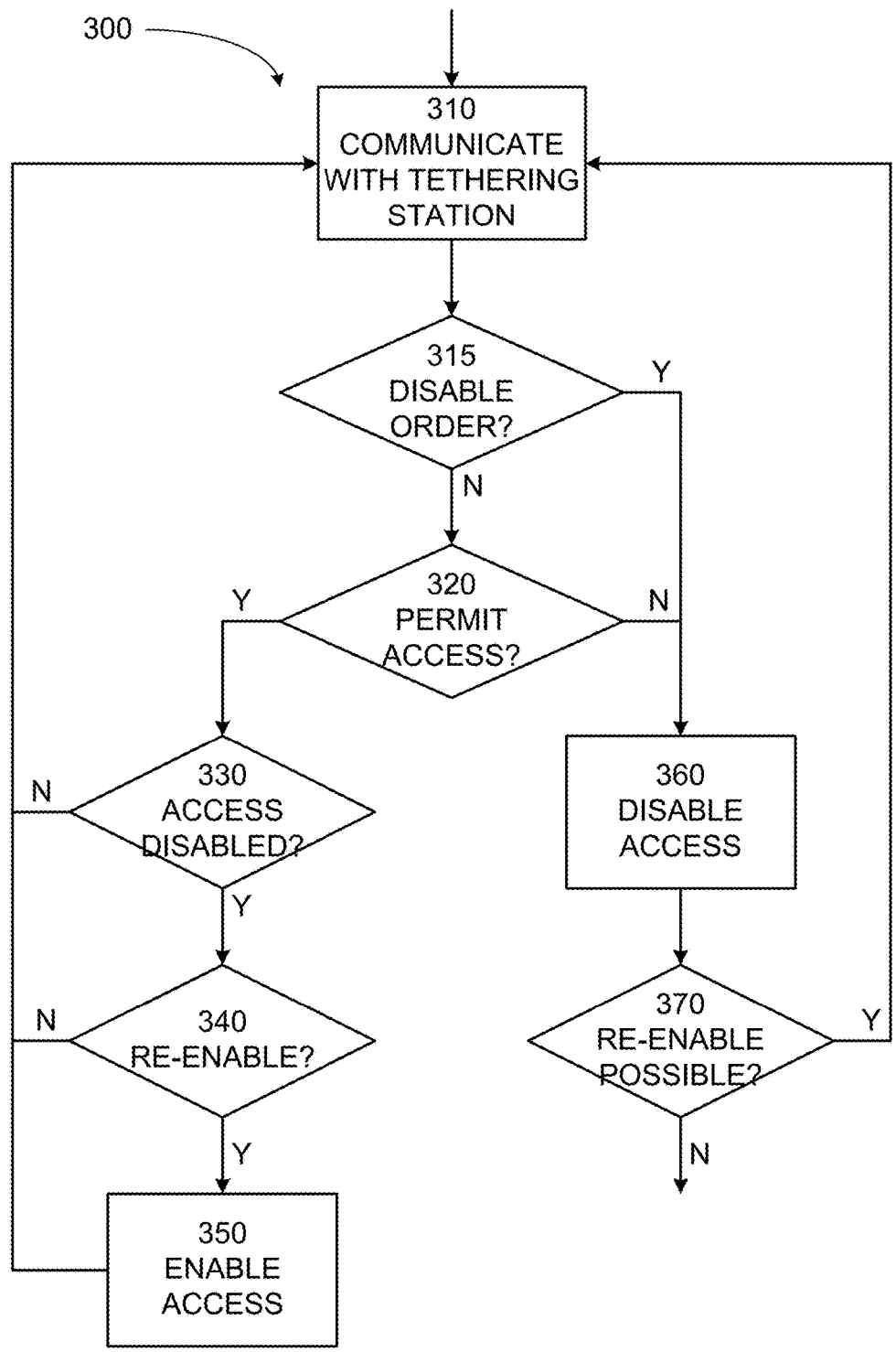

FIG. 3B illustrates a non-limiting flow chart of another method performed by the wireless storage controller 205 to implement the radio tethering. FIG. 3B differs from FIG. 3A in that step 315, the processor 220 can determine whether the downlink message from the tethering station 120 includes a disable order. When the disable order is received (YES in step 315), the processor 220 then can proceed directly to step 360 to disable the application access. In an embodiment, the tethering station 120 may receive the disable order from the server 110, and forward the disable order to the wireless storage controller 205 in the downlink message.

While not specifically illustrated in FIGS. 3A and 3B, the following should be noted. In one embodiment, if the wireless storage controller 205 is unable to communicate with the tethering station 120 (e.g., wireless storage controller 205 is out of the communication range 135, the tethering station 120 is not transmitting, etc.), then the processor 220 can disable access to the any of the applications stored in the mobile storage 230 or can disable access to the mobile storage 230 itself. The disablement can be recoverable or unrecoverable.

Figure 7:
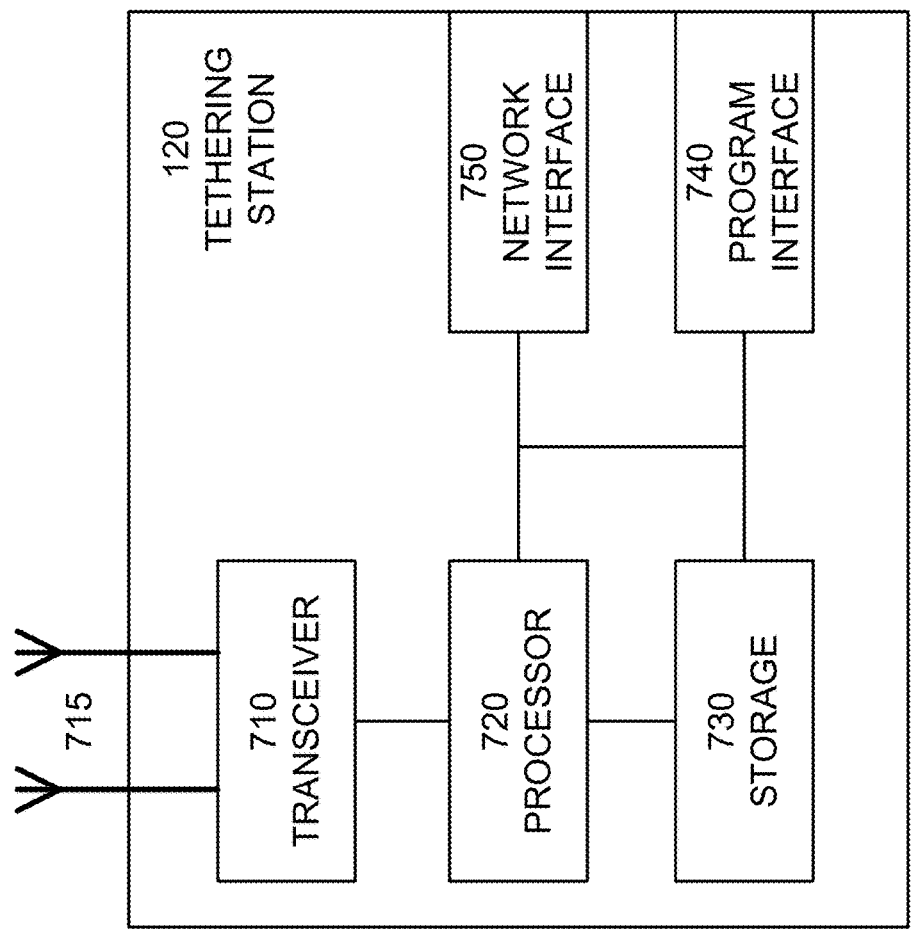
FIG. 7 is a block diagram of a non-limiting example of a tethering station configured to implement radio tethering.

FIG. 7 is a block diagram of a non-limiting example of a tethering station 120. The tethering station 120 may include a transceiver 710, a processor 720, a storage 730, a program interface 740 and a network interface 750. It is envisioned that each of the elements 710, 720, 730, 740 and 750 and 24 maybe implemented in hardware, software, or a combination thereof such that the tethering station 120 as a whole is implemented in hardware or as a combination of hardware and software.

The transceiver 710 may communicate over the radio link with the wireless storage controller 205 via one or more antennas 715, which can be internal or external. The storage 730 may include one or more non-transitory storage medium and/or firmware (e.g., ROM, RAM, Flash) and may be configured to store therein data including one or more applications. The storage 730 may be volatile, non-volatile, or include a combination of volatile and non-volatile memory devices. The program interface 740 may read data from and write data to the storage 730. When physically connected to the wireless storage device 130, the program interface 740 may be used to program the wireless storage device 130 with applications and/or keys. The program interface 740 may also be used to exchange pairing information and/or keys with the wireless storage device 130. The network interface 750 may be used to communicate with the server 110 securely over the network 115. The processor 720 may control the overall operations of the tethering station 120 including individually controlling any one or more of the transceiver 710, the storage 730, the program interface 740 and the network interface 750.

Figure 8:
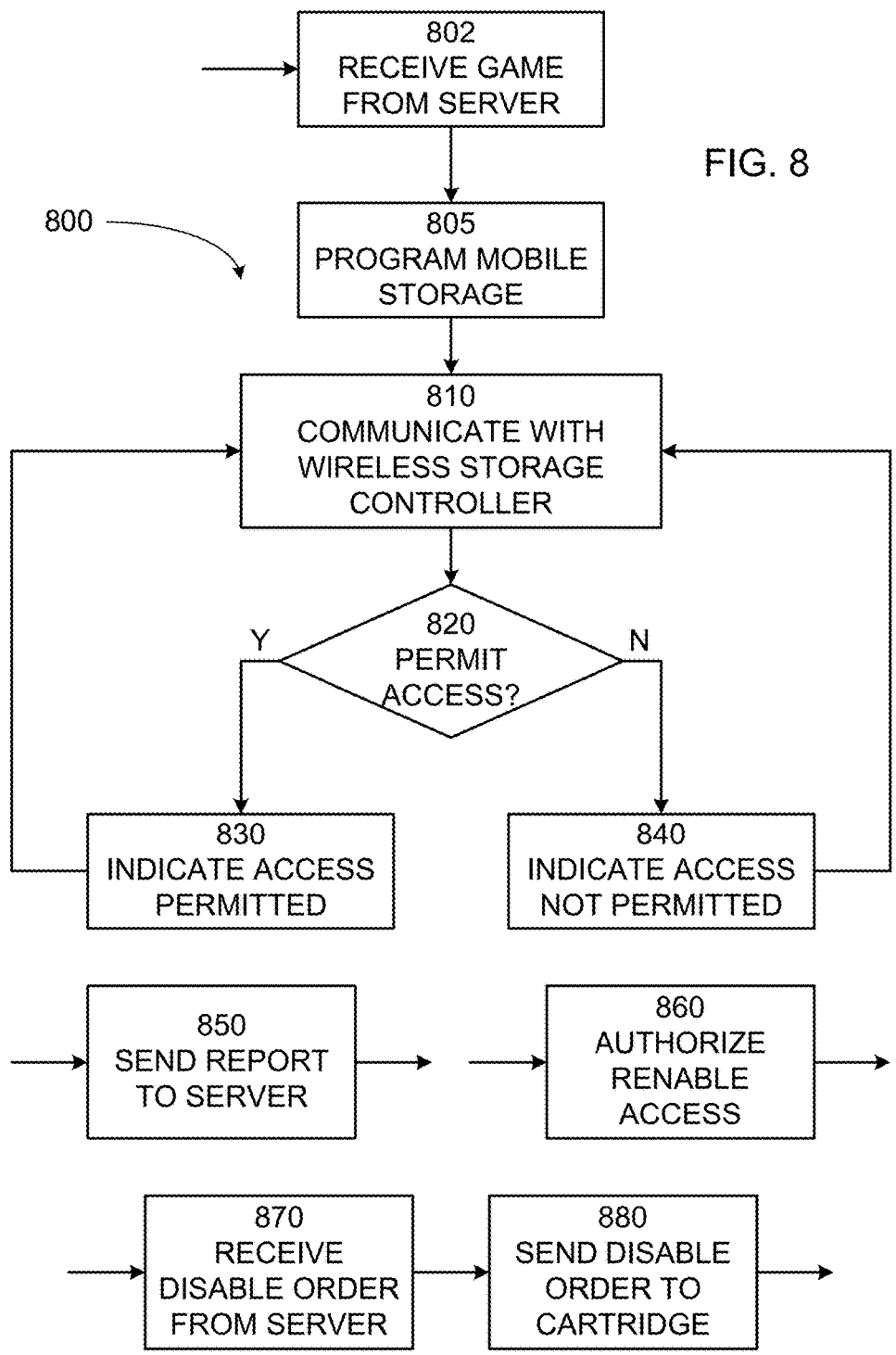
FIG. 8 illustrates a flow chart of a non-limiting method performed by a tethering station to implement radio tethering.

FIG. 8 illustrates a non-limiting flow chart of a method 800 performed by the tethering station 120 to implement the radio tethering. In step 802, the network interface 750 may receive one or more applications from the server 110, e.g., over the network 115. The applications may be stored in the storage 730. In step 805, the processor 720 may program the mobile storage 230 with the application(s) through the program interface 740. In one embodiment, when the mobile storage 230 and the wireless storage controller 205 are integrated in to a single wireless storage device 130, the application(s) may be written to the mobile storage 230 when the wireless storage device 130 is physically connected to the tethering station 120. In another embodiment, when the mobile storage 230 is separable and is connected to the tethering station 120, the application(s) may be written directly to the mobile storage 230 through the program interface 740. Of course, it is also possible to write to the mobile storage 230 when the separable mobile storage 230 is connected to the wireless storage controller 205 which in turn is connected to the tethering station 120. The application(s) written to the mobile storage 230 may be read from the storage 730. In another embodiment, the application(s) received by the network interface 750 may be directly transferred to the program interface 740. Along with the application(s), the processor 720 may also program and/or exchange with the wireless storage controller 205 and/or the mobile storage 230 pairing indication(s), one or more keys used to authenticate the downlink and/or the uplink messages, and one or more keys used to encrypt and decrypt the downlink and/or the uplink messages.

Thereafter in step 810, the tethering station 120 may communicate with the wireless storage controller 205 over the radio link. That is, the transceiver 710 may send downlink messages to and receive uplink messages from the wireless storage controller 205. As mentioned previously, it is preferred that the communication between the tethering station 120 and the wireless storage controller 205 occurs regularly. Recall that in one or more embodiments, the wireless storage controller 205 uses the downlink messages to determine whether it is within the allowable range 135 or not. Thus, it may be preferred that the transceiver 710 transmits the downlink messages frequently.

But also recall that in other embodiments, the tethering station 120 may make the determination and notify the wireless storage controller 205. In step 810, during one of these communications, the transceiver 710 may receive uplink messages. In step 820, the processor 720 may determine whether the computing system is permitted access based on the uplink message. The processor 720 may perform step 820 in plural ways, e.g., in ways similar to those illustrated in FIGS. 4A-4F except that the uplink messages are used. Since it is relatively straight forward to modify FIGS. 4A-4F for uplink messages, the modified figures are not shown.

When it is determined that the computing system is permitted access (YES in step 820), the processor 720 in step 830 may include the notification in the downlink message in which the notification indicates that the computing system is permitted access. When it is determined that the computing system is permitted access (NO in step 820), the processor 720 in step 830 may include the notification in the downlink message that indicates otherwise.

In step 850, the processor 720 may send reports to the server 110 over the network 115 via the network interface 750. The reports may be initiated by the processor 720 or may be requested by the server 110. The reports may be sent on an as needed basis or may be sent periodically. The reports may be based on the uplink and/or downlink messages. Sending of the reports is an advantage in that a form of real-time monitoring information can be made available. This can aid the evaluation process as well as enhance security. In step 860, the processor 720 may authorize, via the transceiver 710, the wireless storage controller 205 to re-enable the computer system access to an application whose access has been disabled. The authorization may be included in one of the downlink messages. While not shown, the processor 720 may request permission from the server 110 to authorize the wireless storage controller 205 and/or the mobile storage 230. In step 880, the processor 720 may explicitly order the wireless storage controller 205 to disable the access by including the disable order in the downlink message. The disable order can be initially received from the server 110 in step 870.

In FIG. 8, the steps 850, 860 and 870, 880 are shown as being separate from steps 802-840. The intent here is to indicate that the tethering station 120 may perform all of the steps of the method 800, but some of the steps may be performed at least somewhat independent of other steps.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A radio tethering system, comprising:
   a tethering station and a wireless storage controller configured to communicate with each other over a radio link,
   wherein the wireless storage controller is configured to selectively control access by a computing system to a software application stored in a storage device,
   wherein the wireless storage controller is further configured to:
      wirelessly receive successive messages from said tethering station over the radio link,
      determine, based on the wireless receiving, whether the tethering station is active or within an allowable range based on whether messages have been received from the tethering station within a threshold time; and
      disable the ability of the computing system to access the software application stored in the storage device whenever the wireless storage controller determines the tethering station is not active or within the allowable range because no said messages have been received from the tethering station within a threshold time.

2. The radio tethering implementation of claim 1, wherein the wireless storage controller is configured to
   determine that the software application access is permitted when the received messages include less than a threshold number of errors, and
   disable the software application access otherwise.

3. The radio tethering implementation of claim 1,
   wherein the tethering station is configured to authenticate with any one or more of the wireless storage controller, the mobile storage, and a combination of the wireless storage controller and the mobile storage, and
   wherein the wireless storage controller is configured to
      determine that the software application access is permitted when it is able to verify that the received messages are from the tethering station, and
      disable the software application access otherwise.

4. The radio tethering implementation of claim 1,
   wherein the tethering station is configured to
      determine whether the software application access is permitted based on an uplink message, the uplink message being a message in a direction from the wireless storage controller to the tethering station over the radio link, and
      include a notification in the received messages based on the determination, the notification indicating whether the software application access is to be enabled or disabled, and
   wherein the wireless storage controller is configured to
      determine that the software application access is enabled when the notification indicates that the application access is permitted, and
      disable the software application access otherwise.

5. The radio tethering implementation of claim 1, further comprising a server configured to securely communicate with the tethering station over a network,
   wherein the tethering station is remote from the server, and
   wherein the tethering station is configured to receive the software application from the server over the network, and to program the mobile storage with the software application.

6. The radio tethering implementation of claim 1, further comprising a server configured to communicate with the tethering station over a network, wherein the tethering station is configured to
receive a disable order from the server over the network, the disable order ordering the wireless storage controller to non-recoverably disable the software application access, and
include the disable order in the received messages sent to the wireless storage controller when it receives the disable order, and
wherein the wireless storage controller is configured to non-recoverably disable the software application access by the computing system when the received messages include the disable order.

7. A radio tethering method performed by a wireless storage controller configured to communicate with a tethering station over a radio link, the wireless storage controller also connected to a computing system, the method comprising:
authenticating a tethering station;
wirelessly receiving successive messages from the tethering station over the radio link;
determining, based on the wireless receiving, whether the tethering station is active or within an allowable range based on whether messages have been received from the tethering station within a threshold time;
enabling the ability of the computing system to access a software application stored in a storage device when it is determined that at least one of said successive messages has been received from the tethering station within a threshold time; and
disabling the ability of the computing system to access the software application stored in the storage device when it is determined the tethering station is not active or within the allowable range indicated by none of said successive messages having been received from the tethering station within the threshold time.

8. The radio tethering method of claim 7, wherein the step of determining whether the to enable or disable application access comprises:
determining to enable access to the software application when the received messages include less than a threshold number of errors; and
disabling access to the software application otherwise.

9. The radio tethering method of claim 7,
wherein the tethering station is authenticated with any one or more of the wireless storage controller, the mobile storage, and a combination of the wireless storage controller and the mobile storage, and
wherein the step of determining whether the access to the software application to be enabled comprises:
determining that access to the software application is enabled when the wireless storage controller verifies that the received messages are from the authenticated tethering station; and
disabling said access otherwise.

10. The radio tethering method of claim 9,
wherein one or more expected keys are used in the authentication, and
wherein determining whether the access is enabled comprises:
determining that the access is enabled when the wireless storage controller successfully performs the authentication using the expected keys; and
disabling the access otherwise.

11. The radio tethering method of claim 7,
wherein the wireless storage controller is configured to communicate with the tethering station using encryption, and
wherein determining whether the access is enabled comprises:
determining that the access is enabled when the wireless storage controller successfully decrypts the received messages; and
disabling the access otherwise.

12. The radio tethering method of claim 7, wherein determining whether the access is enabled comprises:
sending a polling message to the tethering station;
determining whether a response to the polling message is received;
determining whether the response can be verified as being from the tethering station when it is determined that the response is received, and
determining that the application access is enabled when the response is verified.

13. The radio tethering method of claim 12,
wherein the response is encrypted, and
wherein determining whether the response can be verified comprises whether the response can be decrypted.

14. The radio tethering method of claim 7,
wherein the received messages include a notification indicating whether the access is or is not enabled, and
wherein determining whether the access is enabled comprises:
determining that the access is enabled when the notification indicates that the access is enabled; and
disabling the access otherwise.

15. The radio tethering method of claim 7, wherein disabling the access comprises any one or more of:
setting a file flag associated with an application file to a DISABLED value;
erasing the application file from the storage device;
disabling access to the storage device; and
rendering the storage device to be inoperative.

16. The radio tethering method of claim 7, further comprising:
determining whether the access is currently disabled; and
determining whether the tethering station is again active or within an allowable range when it is determined that the access is currently disabled,
wherein re-enabling the access is performed by the wireless storage controller when it is determined that the tethering station is again active or within an allowable range.

17. The radio tethering method of claim 7, further comprising:
determining whether the received messages include a disable order; and
non-recoverably disabling the access when it is determined that the received messages include the disable order.

18. A radio tethering method performed by a tethering station configured to wirelessly communicate with a wireless storage controller over a radio link, the wireless storage controller being detachably attached to a computer system and configured to control access by the computing system to a software application stored in a storage device, the method comprising:
attaching the wireless storage controller to the computer system;
authenticating the wireless storage controller with the tethering station;
receiving an uplink message from the wireless storage controller over the radio link;
determining whether or not access to the software application stored in the storage device is permitted based on the uplink message and the authentication, the access being an access to the software application stored in the storage device whose access is controlled by the wireless storage controller; and continually sending downlink messages to the wireless storage controller over the radio link based on the determination, so that new downlink messages always arrive to the wireless storage controller within a threshold time, an interruption in the continually sending for more than the threshold time comprising a notification to the wireless storage controller to disable access by the computing system to the software application stored in the storage device because the tethering station is no longer active or within an allowable range.

19. The radio tethering method of claim 18, wherein determining whether or not the access is permitted comprises:
   determining that the access is permitted when the uplink message includes less than a threshold number of errors; and
   determining that the access is disabled otherwise.

20. The radio tethering method of claim 18, wherein:
   authenticating comprises authenticating any one or more of the wireless storage controller, the mobile storage, and a combination of the wireless storage controller and the mobile storage, and
   wherein determining whether or not the access is permitted comprises:
      determining that the access is permitted when the tethering station verifies that the uplink message is from the wireless storage controller, the mobile storage, and/or the combination of the wireless storage controller and the mobile storage; and
      disabling the access otherwise.

21. The radio tethering method of claim 20, further comprising programming the wireless storage controller and/or the mobile storage or exchanging with the wireless storage controller and/or the mobile storage an indication indicating that the wireless storage controller, the mobile storage and/or the combination of the wireless storage controller and the mobile storage have been authenticated.

22. The radio tethering method of claim 18,
   wherein the tethering station is configured to communicate with the wireless storage controller using encryption, and
   wherein determining whether or not the access is permitted comprises:
      determining that the access is permitted when the tethering station is able to decrypt the uplink message; and
      disabling the access otherwise.

23. The radio tethering method of claim 22, further comprising programming the wireless storage controller and/or the mobile storage or exchanging with the wireless storage controller and/or the mobile storage one or more keys used to encrypt and decrypt the downlink and/or the uplink messages.

24. The radio tethering method of claim 18, further comprising:
   receiving a software application file from a server over a network, the tethering station being remote from the server and configured to securely communicate with the server over the network;
   writing the software application file to the storage; and
   selectively enabling or disabling access to the storage device.

25. The radio tethering method of claim 24, further comprising sending a report to the server based on the uplink message.

26. The radio tethering method of claim 24, further comprising:
   receiving a disable order from the server, the disable order ordering the wireless storage controller to disable the access; and
   including the disable order in the downlink message when the disable order is received.

27. The radio tethering implementation of claim 1 wherein the tethering station is configured to cryptographically authenticate the wireless storage controller.

28. The radio tethering implementation of claim 1 wherein the wireless storage controller is configured to enable and disable on the application level.

29. The radio tethering system of claim 1 wherein the wireless storage controller is configured to select whether disabling said access is to be recoverable or non-recoverable.

30. The radio tethering system of claim 1 wherein the wireless storage controller is configured to erase the software application from the storage device when it disables said access.

31. The radio tethering system of claim 1 wherein the wireless storage controller is configured to disable an interface from responding to requests from the computing system for the application when it disables said access.

32. The radio tethering system of claim 1 wherein the wireless storage controller is further configured to selectively reenable said access after disabling said access.

* * * * *